United States Patent
Shibata

(10) Patent No.: US 8,331,515 B2
(45) Date of Patent: Dec. 11, 2012

(54) CLOCK REGENERATION CIRCUIT AND RECEIVER USING THE SAME

(75) Inventor: Kazunori Shibata, Osaka (JP)

(73) Assignee: Icom Incorporated (JP)

( * ) Notice: Subject to any disclaimer, the term of this patent is extended or adjusted under 35 U.S.C. 154(b) by 343 days.

(21) Appl. No.: 12/935,039

(22) PCT Filed: Mar. 27, 2009

(86) PCT No.: PCT/JP2009/056371
§ 371 (c)(1),
(2), (4) Date: Sep. 28, 2010

(87) PCT Pub. No.: WO2010/013512
PCT Pub. Date: Feb. 4, 2010

(65) Prior Publication Data
US 2011/0019788 A1  Jan. 27, 2011

(30) Foreign Application Priority Data
Jul. 31, 2008  (JP) .................................. 2008-198884

(51) Int. Cl.
*H04L 7/00* (2006.01)
(52) U.S. Cl. ........................................ 375/355; 375/371
(58) Field of Classification Search .................. 375/355, 375/130, 147, 316, 354, 371, 376; 370/503, 370/509, 512
See application file for complete search history.

(56) References Cited

U.S. PATENT DOCUMENTS

| | | | |
|---|---|---|---|
| 5,917,871 A | 6/1999 | Yamaki | |
| 6,212,241 B1 | 4/2001 | Higuchi | |
| 6,633,621 B1 * | 10/2003 | Bishop et al. | 375/376 |
| 7,649,957 B2 * | 1/2010 | Garrity et al. | 375/280 |
| 7,738,614 B2 | 6/2010 | Akahori | |
| 2007/0147565 A1 | 6/2007 | Akahori | |

FOREIGN PATENT DOCUMENTS

| | | |
|---|---|---|
| JP | 10-4436 | 1/1998 |
| JP | 2006-254296 | 9/2006 |
| JP | 2007-13620 | 1/2007 |
| JP | 20007023620 | 2/2007 |
| JP | 2007-181016 | 7/2007 |

* cited by examiner

*Primary Examiner* — Khai Tran
(74) *Attorney, Agent, or Firm* — Gerald E. Hespos; Michael J. Porco

(57) ABSTRACT

Provided are a clock regeneration circuit and a receiver, wherein difference values (V1, V2, V3) from an ideal value can be obtained for respective three sample data (T1, T2, T3) which are obtained by oversampling a 4-level FSK demodulated signal at a higher frequency than that of a symbol clock and in which sample data (T2) at a symbol point (P) is included at a median, and a sampling timing of the symbol point (P) is shifted toward a point where the sample data (T3) having a smaller difference value is obtained, by a time corresponding to the difference value (V2) at the symbol point. Thus, the clock regeneration circuit and the receiver are capable of regenerating a stable clock from multi-level modulated waves in a small calculation amount.

4 Claims, 14 Drawing Sheets

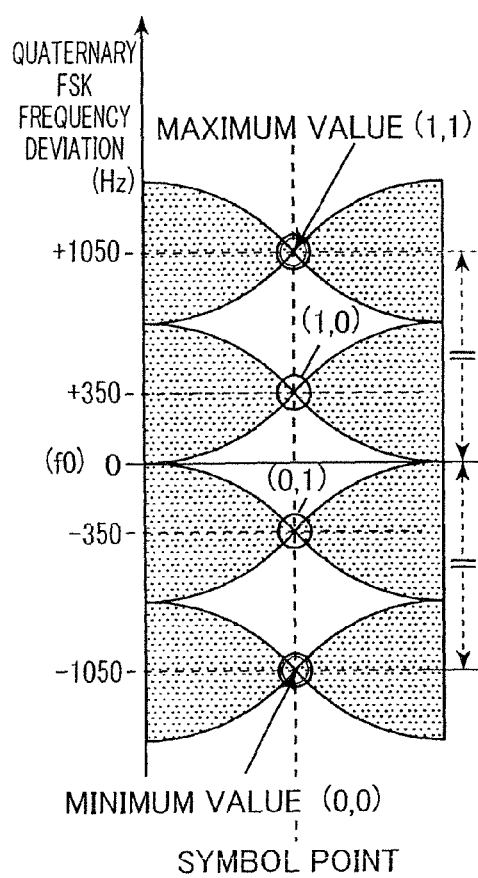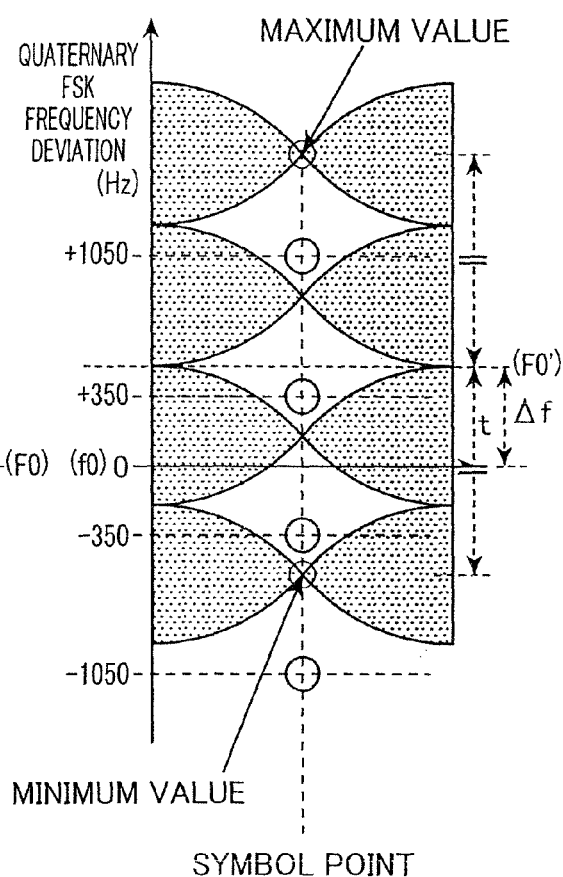

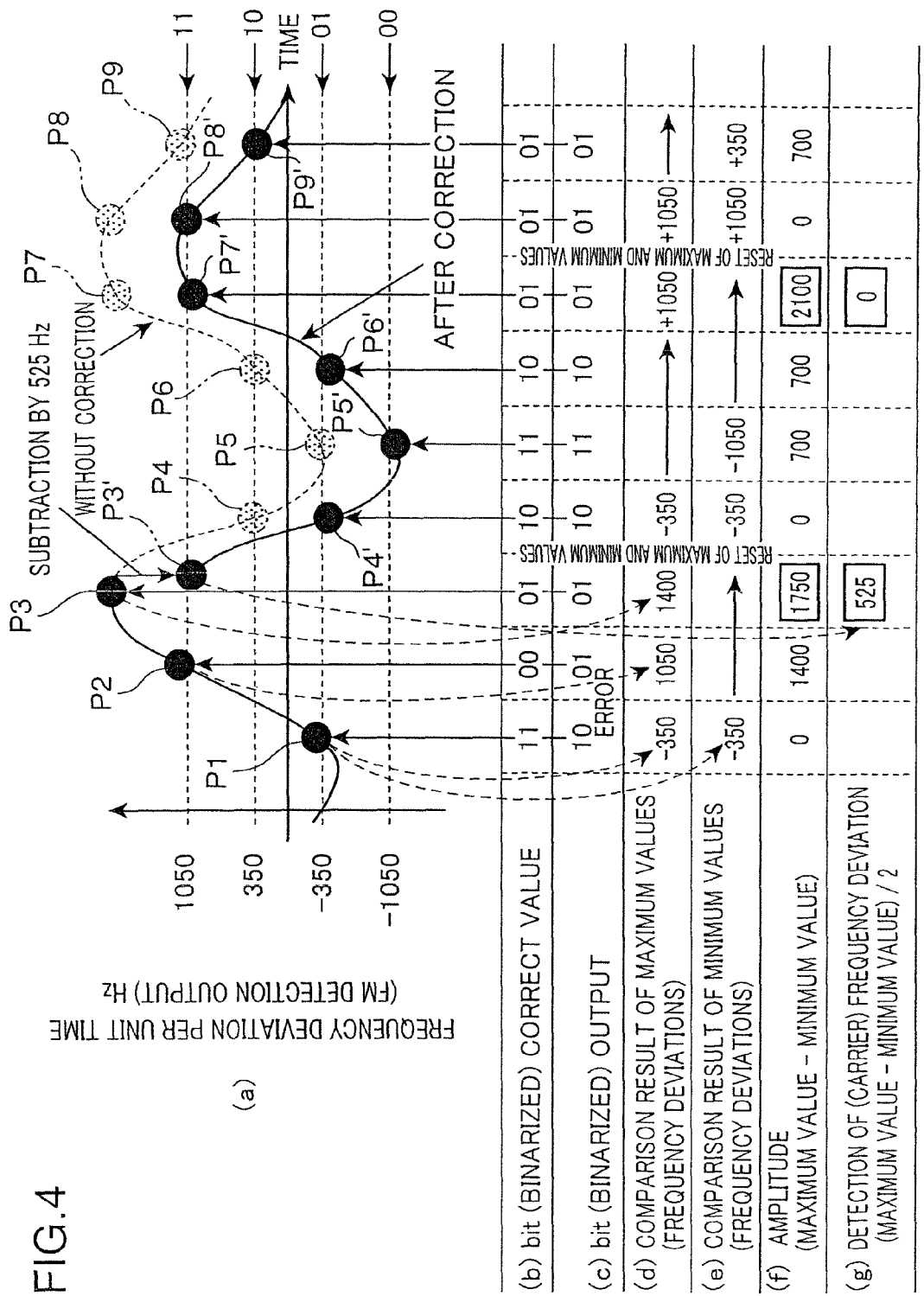

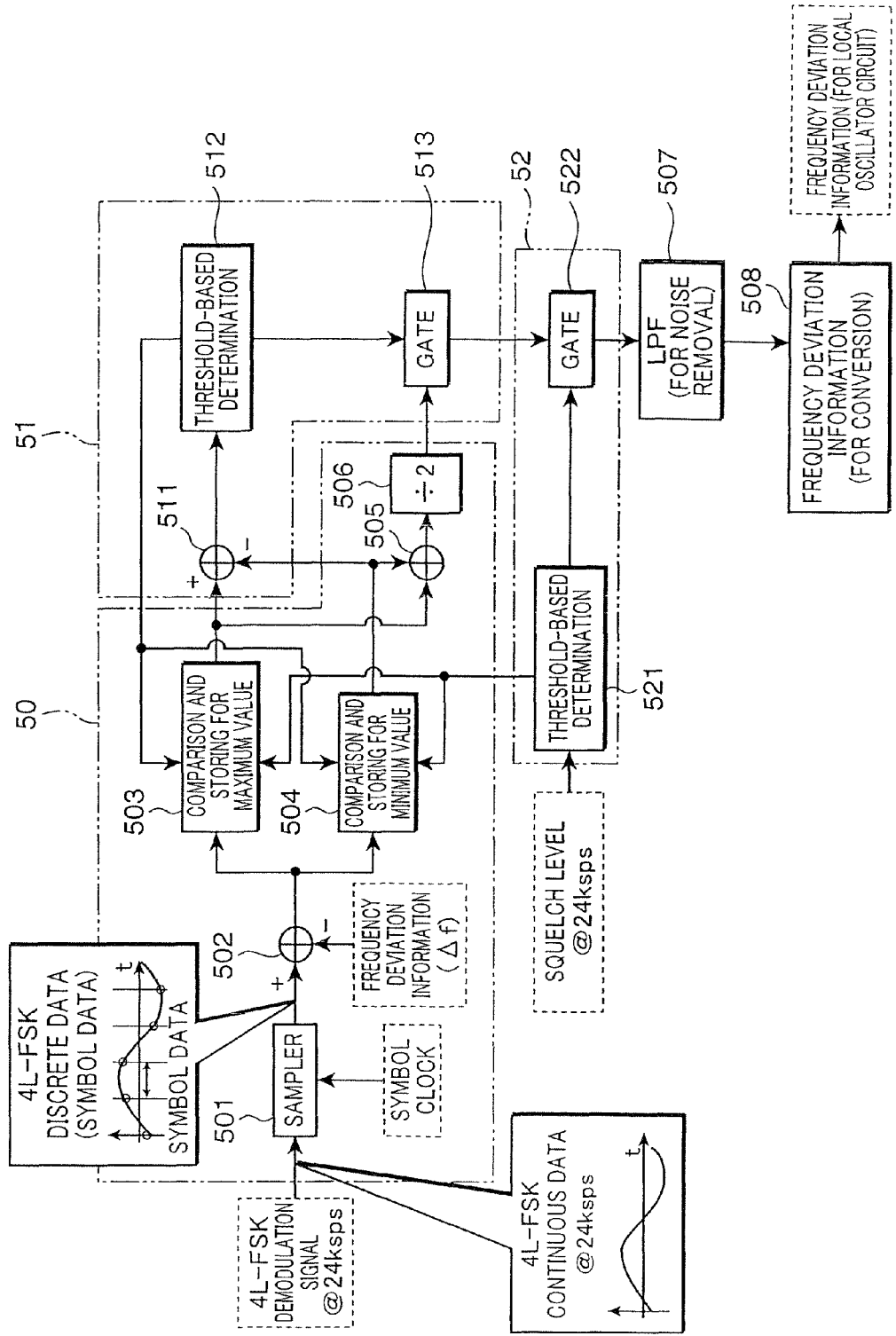

CLOCK REGENERATION CIRCUIT AND RECEIVER USING THE SAME

BACKGROUND OF THE INVENTION

1. Field of the Invention

The present invention relates to a circuit for, in a digital demodulator operable to perform demodulation of symbol values from a received signal, regenerating a symbol clock which defines a timing of performing a determination on the symbol values, and a receive using the same.

2. Description of the Related Art

In a configuration designed to transmit a clock from a base station, such as conventional mobile communication using a base station, synchronization can be obtained by receiving the clock from the base station. However, in a wireless unit where a call is made only when necessary, such as a 400 MHz band digital wireless unit, in order to demodulate symbol values after receiving a modulated signal by means of FSK (Frequency Shift Keying) or the like, it is necessary to firstly regenerate the aforementioned symbol clock. Heretofore, common symbol-clock regeneration has been performed by allowing a signal obtained by squaring a demodulated signal to pass through a band-pass filter having a center frequency at a clock frequency. Then, in order to correct a phase difference caused by the band-pass filter, there has been employed a method of performing the correction, for example, by detecting the phase difference based on a zero cross point where a positive/negative sign of a clock component is changed. In 2-level modulated waves by means of 2-level FSK or the like, a demodulated signal is formed in a shape close to a sinusoidal wave, so that it becomes possible for the above conventional technique to extract a clock component by squaring a demodulated signal, as described above. However, in multi-level modulated waves by means of 4-level FSK or the like, a demodulated signal has a plurality of amplitudes, so that a clock component cannot be extracted even if the square calculation is performed. Therefore, as a conventional technique for solving such a problem, JP 10-4436A is cited, for example.

In JP20-4426A, in cases where there is a transition between sample values having different absolute values, as in the above 4-level FSK, a curve representing the transition deviates from a timing of a clock having a proper zero-crossing timing. Thus, a clock regeneration circuit is shown which is operable, after detecting multi-level modulated waves, to perform oversampling at a clock faster than the symbol clock, and make a judgment on delay or advance of a regenerated clock, depending on whether a cross timing signal output at a timing when a data sequence obtained by the sampling crosses a threshold value is in a first half of a symbol interval or in a last half of the symbol interval.

Meanwhile, it is known that, if the Nyquist second criterion is not satisfied, a deviation occurs in a timing when an interstate transition curve crosses a given voltage. When communication is performed in a narrow band, a situation arises where the Nyquist second criterion is not satisfied, so that, in the above conventional technique, a deviation occurs in a cross point with the threshold value, in each symbol. Consequently, it cannot be determined whether a phase of the regenerated clock is delayed or advanced, to cause difficulty in stable clock regeneration. Particularly, if the cross timing signal is output at a timing during state transition of the clock, a 180° delay and a 180° advance will not be able to be distinguished from each other. Moreover, as the number of threshold values is increased, a calculation amount of a timing calculation is increased.

SUMMARY OF THE INVENTION

The present invention is an invention made in view of the above circumstances, and an object thereof is to provide a clock regeneration circuit capable of regenerating a stable clock from multi-level modulated waves in a small calculation amount, and a receiver using the same.

In a clock regeneration circuit and a receiver according to the present invention, a difference value from an ideal value is derived for each of three sample data which are obtained by oversampling a demodulated signal at a frequency higher than that of a symbol clock and in which sample data at a symbol point is included at a median thereof, and then a sampling timing of the symbol point is shifted toward a point where one of the remaining sample data having a smaller difference value is obtained, by a time corresponding to the difference value at the symbol point. Thus, the clock regeneration circuit and the receiver according to the present invention can regenerate a stable clock from multi-level modulated waves in a small calculation amount.

These and other objects, features and advantages of the present invention will become more apparent upon reading the following detailed description along with the accompanying drawings.

BRIEF DESCRIPTION OF THE DRAWINGS

FIG. 3 is a waveform chart for explaining a DC offset which occurs in a received signal due to a deviation between transmitted and received frequencies, in quaternary FSK.

FIG. 4 is a diagram for explaining a DC offset correction operation and a correction control operation in the FSK receiver illustrated in FIG. 1.

FIG. 5 is a diagram showing one example of configurations of a DC offset correction circuit and a correction control circuit each performing the operation illustrated in FIG. 4.

DETAILED DESCRIPTION OF THE PREFERRED EMBODIMENTS

One embodiment of the present invention will now be described based on the drawings. In the figures, elements or components with the same code mean that they are the same components, and duplicated description thereof will be omitted on a case-by-case basis.

Figure 1:
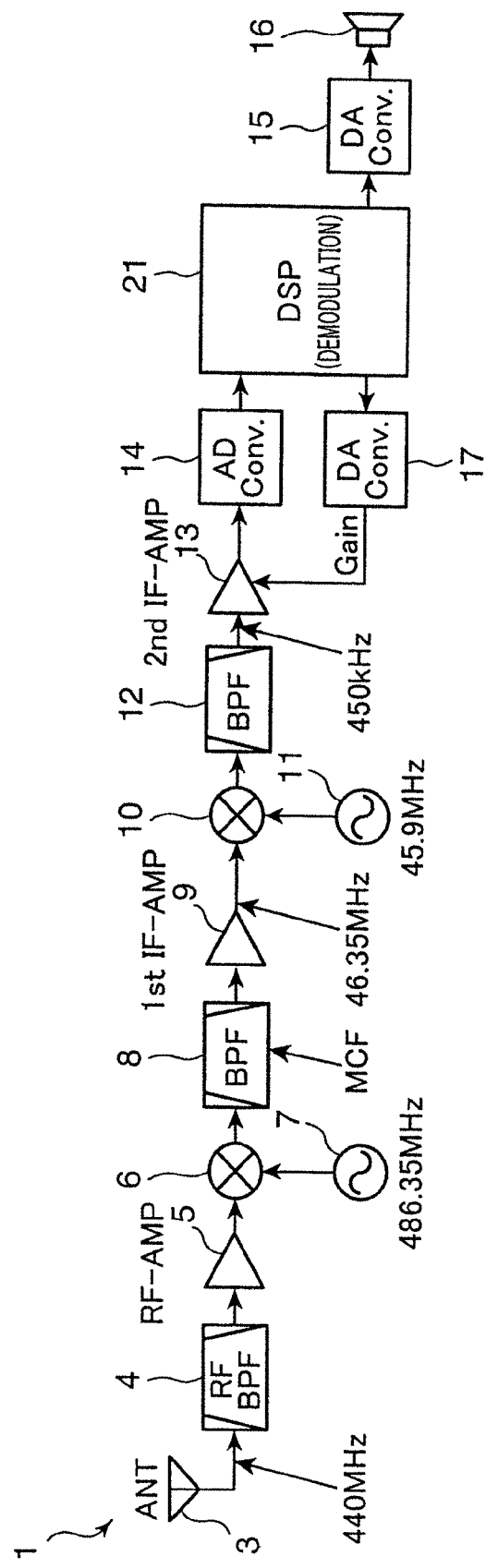
FIG. 1 is a block diagram showing an electrical configuration of an FSK receiver according to one embodiment of the present invention.

FIG. 1 is a block diagram showing an electrical configuration of an FSK receiver 1 according to one embodiment of the present invention. This FSK receiver 1 is formed using a double super heterodyne system. For example, as shown in FIG. 1, it comprises an antenna 3, a band-pass filter 4, an amplifier 5, a mixer 6, a local oscillator circuit 7, a band-pass filter 8, an amplifier 9, a mixer 10, a local oscillator circuit 11, a band-pass filter 12, an amplifier (intermediate frequency amplifier) 13, an analog/digital converter 14, a digital/analog converter 15, a speaker 16, a digital/analog converter 17, and a demodulator circuit 21.

In the FSK receiver 1, a signal is received by the antenna 3, and an FSK high-frequency signal component, for example, of 440 MHz, is extracted through the band-pass filter 4 and amplified by amplifier 5, whereafter the amplified signal is input into the first-stage mixer 6. In the mixer 6, the input signal is mixed with an oscillation signal, for example, of 486.35 MHz, from the local oscillator circuit 7, to obtain an intermediate frequency signal (first intermediate frequency signal), for example, of 46.35 MHz. Then, a component of the intermediate frequency signal is extracted by the band-pass filter 8 and amplified by the amplifier 9, whereafter the amplified signal is input into the second-stage mixer 10. In the mixer 10, the input signal is mixed with an oscillation signal, for example, of 45.9 MHz, from the local oscillator circuit 11, to obtain an intermediate frequency signal (second intermediate frequency signal), for example, of 450 kHz. Then, an intermediate frequency component of the signal is extracted by the band-pass filter 12 and amplified by the amplifier (intermediate frequency amplifier) 13, whereafter the amplified signal is input into the analog/digital converter 14. In the analog/digital converter 14, the input signal is down-sampled, for example, at 30 kHz, and converted into digital values having a rate of 96 ksps (sample per second), whereafter the digital values are input into the demodulator circuit 21.

The demodulator circuit 21 is constructed to be equipped with a DSP (Digital Signal Processor). In the demodulator circuit 21, an audio signal is demodulated. The audio signal is analog-converted by the digital/analog converter 15, and audio is generated from the speaker 16. Further, the demodulator circuit 21 is operable to output data depending on the input signal, to the digital/analog converter 17. Thus, the data is analog-converted to perform a gain control for each of the RF amplifier 5 and the intermediate frequency amplifiers 9, 13.

Figure 2:
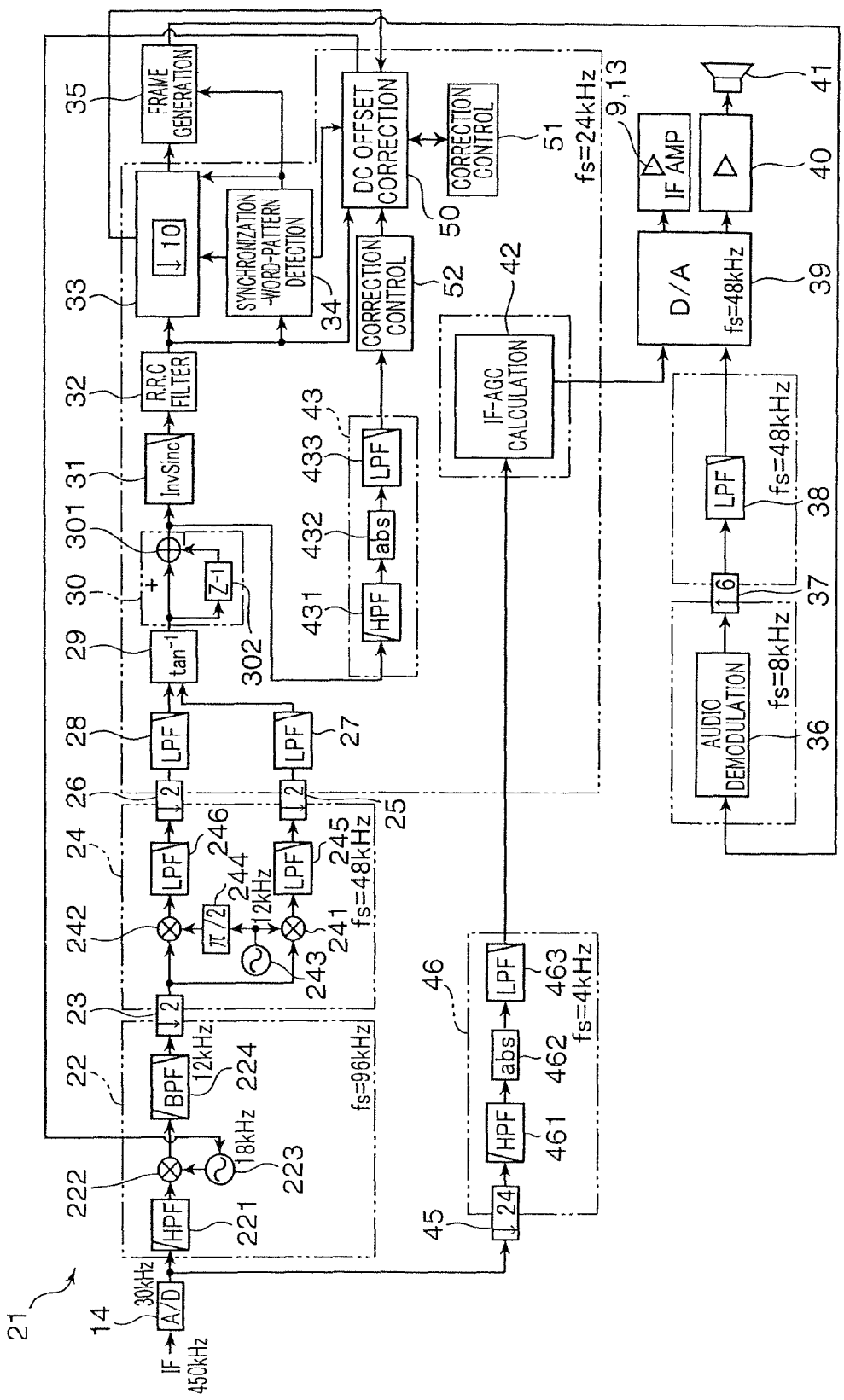
FIG. 2 is a block diagram showing one example of a configuration of a demodulator circuit in the FSK receiver illustrated in FIG. 1.

FIG. 2 is a block diagram showing one example of a configuration of the demodulator circuit 21. The signal output from the analog/digital converter 14 is input into a frequency converter 22, and a high-frequency component is firstly extracted by a high-pass filter 221. Subsequently, in a mixer 222, the high-frequency component is mixed with an oscillation signal output from a local oscillator circuit 223, for example, at 18 kHz and a rate of 96 ksps, to obtain a signal having 12 kHz and 96 ksps, and a component of the signal is extracted by a band-pass filter 224. Then, in a converter 23, the extracted component is decimated to ½, i.e., down-sampled to a ½ frequency (48 kHz), whereafter the down-sampled signal is input into a quadrature converter 24. The converter 23 is provided to reduce a processing in the quadrature converter 24. Thus, if the processing falls within capabilities of the quadrature converter 24, the converter 23 may be omitted.

In the quadrature converter 24, the input signal is distributed to two paths, and input into respective ones of two mixers 241, 242. In the mixer 241, the signal distributed to one of the paths is mixed with an oscillation signal output from a local oscillator circuit 243, for example, at an oscillation frequency of 12 kHz and a rate of 48 ksps. In the mixer 242, the signal distributed to the other path is mixed with a signal obtained by shifting a phase of the oscillation signal output from the local oscillator circuit 243, by 90 degrees through a phase shifter 244. The two mixed signals serve as respective ones of I and Q components of a quadrature-converted signal each having a rate of 48 ksps. Each of the I and Q component signals is output through a corresponding one of two low-pass filters 245, 246, and down-sampled to a ½ sampling frequency (24 kHz) by a corresponding one of two converters 25, 26. Then, after passing through corresponding ones of two low-pass filters 27, 28, the down-sampled signals are input into a phase detector 29. The converters 25, 26 are provided to reduce a load of a band limiting processing in the low-pass filters 27, 28. Thus, if the processing falls within capabilities of each of the low-pass filters 27, 28, the converters 25, 26 may be omitted.

The phase detector 29 is operable, based on the I and Q components, to calculate $\theta = \tan^{-1}(Q/I)$, wherein $I = \cos\theta$, and $Q = \sin\theta$, to derive a signal phase. In an adder 301 of a frequency detector 30, a phase delayed by a delay device 302 to serve as a phase preceding by one sampling period is subtracted from the derived phase. In this way, an amount of the aforementioned frequency deviation, i.e., a phase differential amount, is derived. As above, the phase detector 29 and the frequency detector 30 constitute a wave detector circuit to perform a delay detection. An output of the wave detector circuit is obtained as a demodulation signal over-sampled at a sampling rate (24 kHz) which is ten times greater than a symbol rate (2.4 kHz).

The demodulation signal is input into a quaternary (4-level) FSK symbol regeneration circuit 33 and a synchronization-word-pattern detection circuit 34, from an inverse-sinc-function filter 31 through a root-raised-cosine filter 32. The inverse-sinc-function filter 31 and the root-raised-cosine filter 32 function as a root cosine roll-off filter, in cooperation with a sinc-function filter inserted in a transmitting side, and a combination thereof achieves a Nyquist filter. Specifically, the sinc-function filter is operable to constrain a high-frequency side, whereas the inverse-sinc-function filter 31 is operable to restore the constrained high-frequency side to its original state (highlight the high-frequency side), so that a band limiting is achieved.

In the quaternary (4-level) FSK symbol regeneration circuit 33, the quaternary FSK symbol data is demodulated from an amplitude value (frequency deviation) of the demodulation signal. During this demodulation, the quaternary FSK symbol regeneration circuit 33 is operable to regenerate the symbol data by internally generating a symbol clock in an after-mentioned manner to acquire the amplitude value (frequency deviation) at a timing of the 2.4 kHz symbol clock, and performing map-based determination to determine to which of the symbol values "00", "01", "10", "11" of the quaternary FSK the amplitude value (frequency deviation) corresponds. In addition, a reset signal is input from the synchronization-word-pattern detection circuit 34 into the quaternary FSK symbol regeneration circuit 33 at a detection timing of a synchronization word pattern to adjust a timing of the internal symbol clock, as described later.

The symbol data demodulated by the quaternary FSK symbol regeneration circuit 33 is output to a frame formation circuit 35 as a 2-bit signal having a symbol rate of 2.4 ksps, as mentioned above because the signal has a quaternary. The frame formation circuit 35 is operable, when a synchronization word pattern is detected by the synchronization-word-pattern detection circuit 34, i.e., signal receiving is normally performed, as described later, to form the symbol data into a given frame, and output the frame to an audio demodulator 36. The correction of the symbol clock by the synchronization-word-pattern detection circuit 34 and the regeneration of the symbol data by the quaternary FSK symbol regeneration circuit 33 will be described in detail later.

In the audio demodulator 36, a compressed signal in the obtained symbol data is expanded from the quaternary data having a sample frequency of 2.4 kHz by using a given audio codec circuit, so that it is demodulated to an 8 kHz, 16-bit PCM audio signal. In a converter 37, the PCM audio signal is over-sampled at a frequency (48 kHz) which is six times greater than the frequency thereof. Then, after passing through a low-pass filter 38, the over-sampled signal is input into a digital/analog converter 39, and demodulated to an analog audio signal, whereafter the analog audio signal is amplified by an amplifier 40, and then audio is generated from a speaker 41.

Meanwhile, the converted data from the analog/digital converter 14 is down-sampled to a ¹⁄₂₄ frequency (4 kHz) by a converter 45, and the down-sampled signal is input into an RSSI circuit 46. In the RSSI circuit 46, a DC component mixed in the input signal through the analog/digital converter 14 is removed by a high-pass filter 461, whereafter an absolute value of a signal level of the input signal is derived by an absolute value circuit 462, and further averaged by a low-pass filter 463, to derive an RSSI level. Then, the RSSI level is input into an AGC calculation circuit 42, while being provided to an indicator (not shown) or the like. The AGC calculation circuit 42 is operable to calculate an IF gain based on the RSSI level. The obtained data is analog-converted by the digital/analog converter 39, and used to perform the gain control for each of the RF amplifier 5 and the intermediate frequency amplifiers 9, 13.

In the FSK receiver 1 constructed as above, it is noted that, in this embodiment, a DC offset correction circuit 50 serving as correction means is provided with two correction control circuits 51, 52 for adjusting the oscillation frequency of the local oscillator circuit 223 (or 243), based on a median value (F0') between the maximum value "11" and the minimum value "00", to remove a DC offset component (f0−F0'=Δf), and the correction is halted depending on conditions. The frequency converter 22 is provided to reduce a processing in the subsequent stage, and may be omitted. In this case, the local oscillator circuit 243 may be configured to output an oscillation signal having an oscillation frequency of 30 kHz and a rate of 96 ksps, and the DC offset correction based on the frequency deviation may be performed by controlling the oscillation frequency of the local oscillator circuit 243.

FIG. 3 is a waveform chart showing a state of the above correction. For example, in this embodiment, a frequency deviation at the minimum value "00", a frequency deviation at "01", a frequency deviation at "10", and a frequency deviation at the maximum value "11", with respect to a carrier frequent f0, are assumed to be set to −1050 Hz, −350 Hz, +350 Hz, and +1050 Hz, respectively.

If a carrier frequency F0 in a receiving side is identical to a carrier frequency f0 in a transmitting side, symbol values obtained at a sample point become equal to the above frequencies, as shown in FIG. 3A. In FIG. 3, for simplicity of explanations, the sample point is set to a symbol determination point which is a point where a deviation becomes minimum in view of an eye pattern. Differently, if a carrier frequency F0' in the receiving side is not identical to the carrier frequency f0 in the transmitting side, a deviation occurs in each of the sample values obtained in the sample point, as shown in FIG. 3B. In the example illustrated in FIG. 3B, the carrier frequency F0' in the receiving side is deviated toward a high-frequency side, so that data at the minimum value "00" does not appear but only the remaining data at "01", "10" and "11" appear. This causes deterioration in sensitivity. Therefore, based on the maximum value "11", the minimum value "00" and a median value (F0') of the demodulation signal, the oscillation frequency of the local oscillator circuit 223 (or 243) is adjusted to remove a DC offset component (f0−F0'=Δf), as mentioned above.

FIG. 4 is a diagram for explaining a correction operation of the DC offset correction circuit 50, and a control operation of the correction control circuit 51 serving as first correction control means. Data having a waveform as shown in FIG. 4(a) is output from the root-raised-cosine filter 32, as the demodulation signal in a state after being over-sampled at 24 kHz (24 ksps) which is ten times greater than the symbol rate (2.4 kHz). When the data is sampled by the quaternary FSK symbol regeneration circuit 33 at the symbol rate 2.4 kHz, sample values (frequency deviations) P1 to P9 indicated by the black circles in FIG. 4(a) are obtained. In fact, the output of the root-raised-cosine filter 32 is data on a wave height value of a DC waveform as shown in FIG. 4(a). However, in FIG. 4(a), for the sake of facilitating understanding of explanations, the DC value is read as if it is a frequency, and a scale is represented as a frequency of the frequency deviation.

In this state, in order to perform the DC offset correction, the DC offset correction circuit 50 is operable to acquire the sample values P1 to P9, wherein it is operable, when a value greater than an existing value is input thereinto, to update a maximum value with the input value, as shown in FIG. 4(d). In the same manner, the DC offset correction circuit 50 is operable, when a value less than an existing value is input thereinto, to update a minimum value with the input value, as shown in FIG. 4(e). Meanwhile, the correction control circuit 51 is operable to derive a difference between the maximum and minimum values, wherein it is operable, if the difference is less than a predetermined threshold value TH1, as shown in FIG. 4(f), to halt the correction operation by the DC offset correction circuit 50, and, if the difference becomes equal to or greater than the threshold value TH1, to instruct the DC offset correction circuit 50 to perform the correction operation, and reset the maximum and minimum values. In other words, the maximum and minimum values are updated with symbol values at a sample point in a next cycle.

The threshold value TH1 is selected to become less than (a maximum frequency deviation−a minimum frequency deviation), wherein, when the demodulation signal is an n-ary coded signal (n is an integer of 3 or more), it is selected to become greater than (the maximum frequency deviation−the minimum frequency deviation)×(n−2)/(n−1), while appropriately taking into account a margin. In this embodiment, n=4, and the maximum frequency deviation and the minimum frequency deviation are +1050 Hz and −1050 Hz, respectively. Thus, the threshold value TH1 should be less than 2100 Hz and greater than 1400 Hz. For example, in consideration of a margin as mentioned above, it may be set to 1500 Hz.

In the example illustrated in FIG. 4, a frequency deviation in the initial sample value P1 is −350 Hz, and this value is registered as each of the maximum and minimum values. A frequency deviation in the second sample value P2 is +1050 Hz, and thus the maximum value is updated with this value. Further, a difference between the maximum and minimum values is 1400 Hz, so that the DC offset correction operation is inhibited. In contrast, a frequency deviation in the sample value P3 is +1400 Hz, and thus the maximum value is updated with this value. Further, a difference between the maximum and minimum values is 1750 Hz, so that the DC offset correction operation is performed. As shown in FIG. 4(g), the correction operation is designed to derive an average value of the maximum and minimum values which corresponds to the Δf in FIG. 3, and subtract the average value from the sample value. For example, in the sample value P3, (1400−350)/2=525 Hz is subtracted from 1400 Hz, and the obtained value 875 Hz is used as a corrected sample value P3'.

An actual correction operation is designed such that data on the frequency deviations to be input is shifted to a low-frequency side by 525 Hz by changing the oscillation frequency of the local oscillator circuit 223 (or 243). Specifically, the local oscillator circuit 223 (or 243) comprises a digital VCO (Voltage-Controlled Oscillator), and the DC offset correction circuit 50 is operable to change a timing of reading waveform data (indicative of an amplitude level) from a sin table to be the basis for an oscillation waveform, so as to change the oscillation frequency, and change the read timing to a timing for allowing a current oscillation frequency to be increased by the above value 525 Hz.

Through this correction operation, data on frequency deviations in the subsequent sample values P4 to P9 is shifted to reference codes P4' to P9', so that the demodulation can be performed under a condition that a determination result in the quaternary FSK symbol regeneration circuit 33 is obtained based on correct values illustrated in FIG. 4(b), instead of values illustrated in FIG. 4(c). In cases where the correction to the sample value P3' is adequate, at a time (P7') when data for one cycle after the correction is input, absolute values of the maximum and minimum values become approximately equal to each other, and thus a correction amount (Δf) becomes zero.

Data on a frequency deviation amount output from the adder 301 is provided to a squelch circuit 43. In the squelch circuit 43, a noise component is extracted by a high-pass filter 431, and an absolute value of the noise is derived by an absolute circuit 432 and further averaged by a low-pass filter 433. Thus, the squelch level is obtained. The correction control circuit 52 is operable, when a squelch level (noise level) is greater than a predetermined threshold value TH2, to inhibit the adjustment of the oscillation frequency of the local oscillator circuit 223 (or 243) by the DC offset correction circuit 50, so as to prevent an erroneous correction due to noise.

FIG. 5 is a diagram showing one example of configurations of the DC offset correction circuit 50 and the correction control circuits 51, 52. As with the quaternary FSK symbol regeneration circuit 33, in a sampler 501, the 24 ksps demodulation signal output from the root-raised-cosine filter 32 is sampled by a clock output from the quaternary FSK symbol regeneration circuit 33 at a symbol rate of 2.4 ksps. Then, in a subtracter 502, frequency deviation information corresponding to the DC offset Δf obtained by an after-mentioned synchronization-word-pattern detection is subtracted from the sampled signal, whereafter the obtained signal is input into two sample-hold circuits 503, 504. The sample-hold circuit 503 is operable to compare data sequentially input thereinto after the reset timing, with stored data, wherein it is operable, when data greater than the stored data is input, to update the stored data with the input value so as to derive the maximum value, and hold the updated data. Similarly, the sample-hold circuit 504 is operable to compare data sequentially input thereinto after the reset timing, with stored data, wherein it is operable, when data less than the stored data is input, to update the stored data with the input value so as to derive the minimum value, and hold the updated data. Then, the maximum and minimum values are added together by an adder 505, and the added data is divided into ½ by a divider 506. In this manner, the above frequency deviation information is derived. In other words, the correction control circuit 51 is operable to permit an output from the divider, and then reset the maximum value held by the sample-hold circuit 503 and the minimum value held by the sample-hold circuit 504. After completion of the reset, each of the sample-hold circuits 503, 504 is operable to compare data sequentially input thereinto, with stored data, and update the stored data depending on a result of the comparison. The information is input into a conversion circuit 508 through a low-pass filter 507 for noise removal, and converted into a timing of reading the waveform data in the digital VCO constituting the local oscillator circuit 223 (or 243), whereafter the read timing is provided to the local oscillator circuit 223 (or 243).

The correction control circuit 51 comprises a subtracter 511 operable to subtract the minimum value held by the sample-hold circuit 504 from the maximum value held by the sample-hold circuit 503 to derive a difference therebetween, a threshold-based determination section 512 operable to compare the derived difference with the threshold value TH1, i.e., 1500 Hz, and a gate 513 operable, when the difference is equal to or greater than the threshold value TH1, to permit the output from the divider 506, and, when the difference is less than the threshold value TH1, to block the output from the divider 506. Similarly, the correction control circuit 52 comprises a threshold-based determination section 521 operable to compare the squelch level output from the squelch circuit 43 with the predetermined threshold value TH2, and a gate 522 operable, when the squelch level is equal to or less than the threshold value TH2, to permit the output from the divider 506, and, when the squelch level is greater than the threshold value TH2, to block the output from the divider 506.

According to the above configuration, in the FSK receiver 1, the correction control circuit 51 is provided to allow the DC offset correction circuit 50 to perform the correction of the DC offset caused by a deviation between transmitted and received frequencies, based on a median value of the maximum and minimum values of the demodulation signal. The correction control circuit 51 is operable, when a difference between the maximum and minimum values is less than the predetermined threshold value TH1, to halt the correction by the DC offset correction circuit 50, so that, for example, in the quaternary FSK signal, the offset correction is performed only if the maximum value "11" and the minimum value "00" are obtained, without being performed based on two codes which are not across the median value, such as "00" and "01", or "10" and "11", or two codes which are across the median value but not equal in terms of a deviation from the median value, such as "00" and "10" or "01" and "11". Thus, even in a multi-level FSK signal, the frequency deviation can be accurately detected to perform an appropriate offset removal. In addition, the offset correction is performed at a time when a signal equal to or greater than the predetermined threshold value is obtained, so that the offset correction can be rapidly performed without a need for monitoring a signal for a long period of time.

Further, the DC offset correction circuit 50 is operable to control one of the oscillation frequency of the local oscillator circuit 223 in the frequency converter 22 for obtaining an intermediate frequency signal from a received high-frequency signal, and the oscillation frequency of the local oscillator circuit 243 in the quadrature converter 24 for quadrature-converting the obtained intermediate frequency signal. Thus, an ability to remove adjacent channel signals can also be enhanced without a need for changing characteristics of the band-pass filter 224 and the low-pass filters 245, 246; 27, 28 (because they have the same passband).

Furthermore, the correction control circuit 52 is operable, when a noise level is high, to halt the correction operation by the DC offset correction circuit 50, in response to the output of the squelch circuit 43, so that an erroneous operation due to noise can also be prevented.

Figure 6:
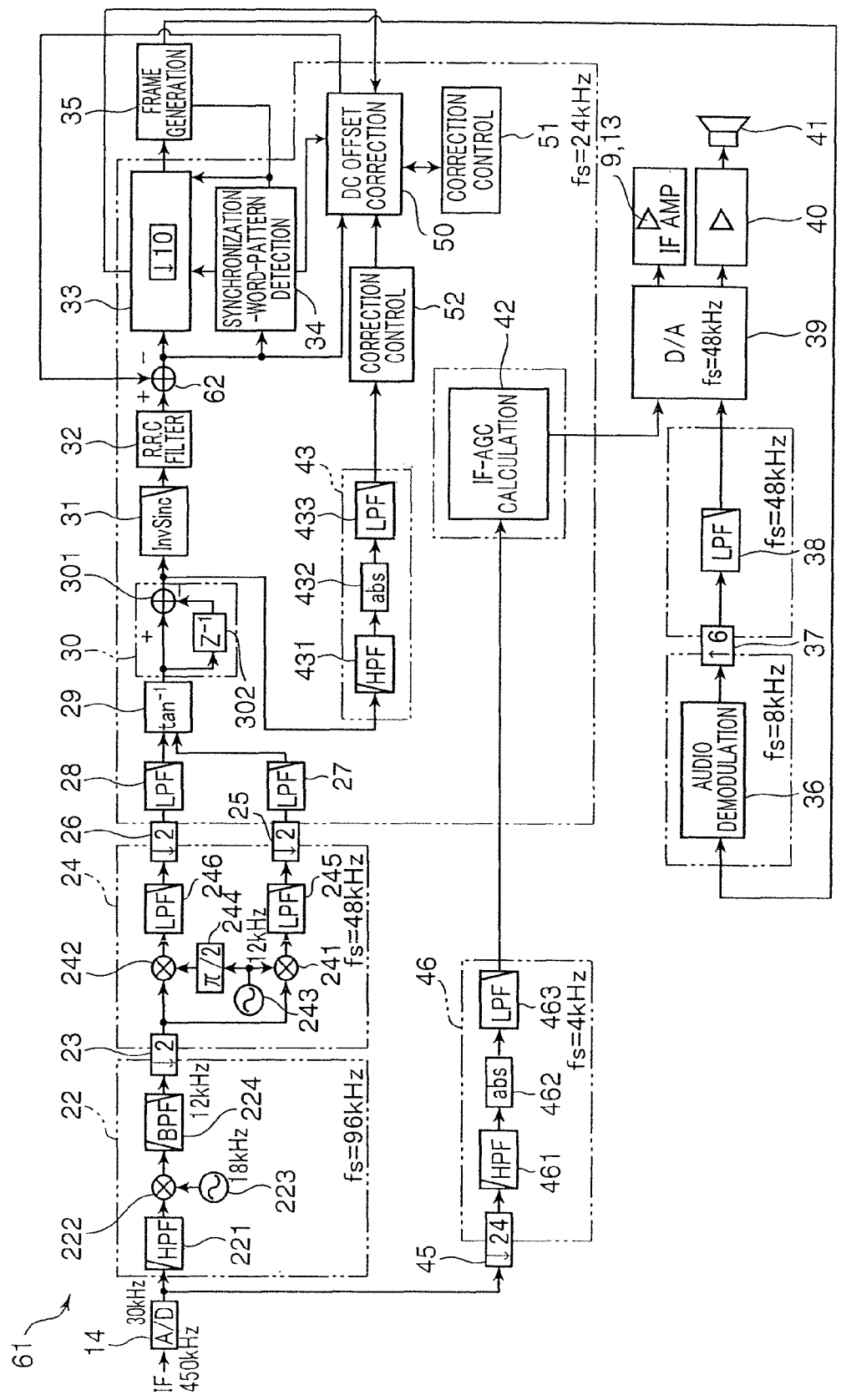
FIG. 6 is a block diagram showing one example of a configuration of a demodulator circuit in an FSK receiver according to another embodiment of the present invention.

The DC offset correction circuit 50 is configured to perform the offset correction by controlling the oscillation frequency of the local oscillator circuit 223 in the frequency converter 22 for obtaining an intermediate frequency signal from a received high-frequency signal or the local oscillator circuit 243 in the quadrature converter 24 for quadrature-converting the obtained intermediate frequency signal, as mentioned above. Alternatively, in another aspect, as shown in a demodulation circuit 61 illustrated in FIG. 6, the DC offset correction circuit 50 may be configured to subtract an average value (median value) of the maximum and minimum values from an output signal level in the 24 ksps demodulation signal output from the root-raised-cosine filter 32 to directly correct a level itself of the demodulation signal. In this case, control of the local oscillator circuit 223 or 243 is not performed.

As above, a DC offset is directly subtracted from the demodulation signal. This makes it possible to rapidly perform the symbol regeneration irrespective of an amount of the frequency deviation. On the other hand, when the oscillation frequency of the local oscillator circuit 223 or 243 is controlled as described above, a center frequency of the obtained intermediate signal always corresponds to a center frequency of the band-pass filter 224 or corresponds to the passband of each of the low-pass filters 245, 246; 27, 28, so that high sensitivity can be obtained with less signal degradation.

Figure 7:
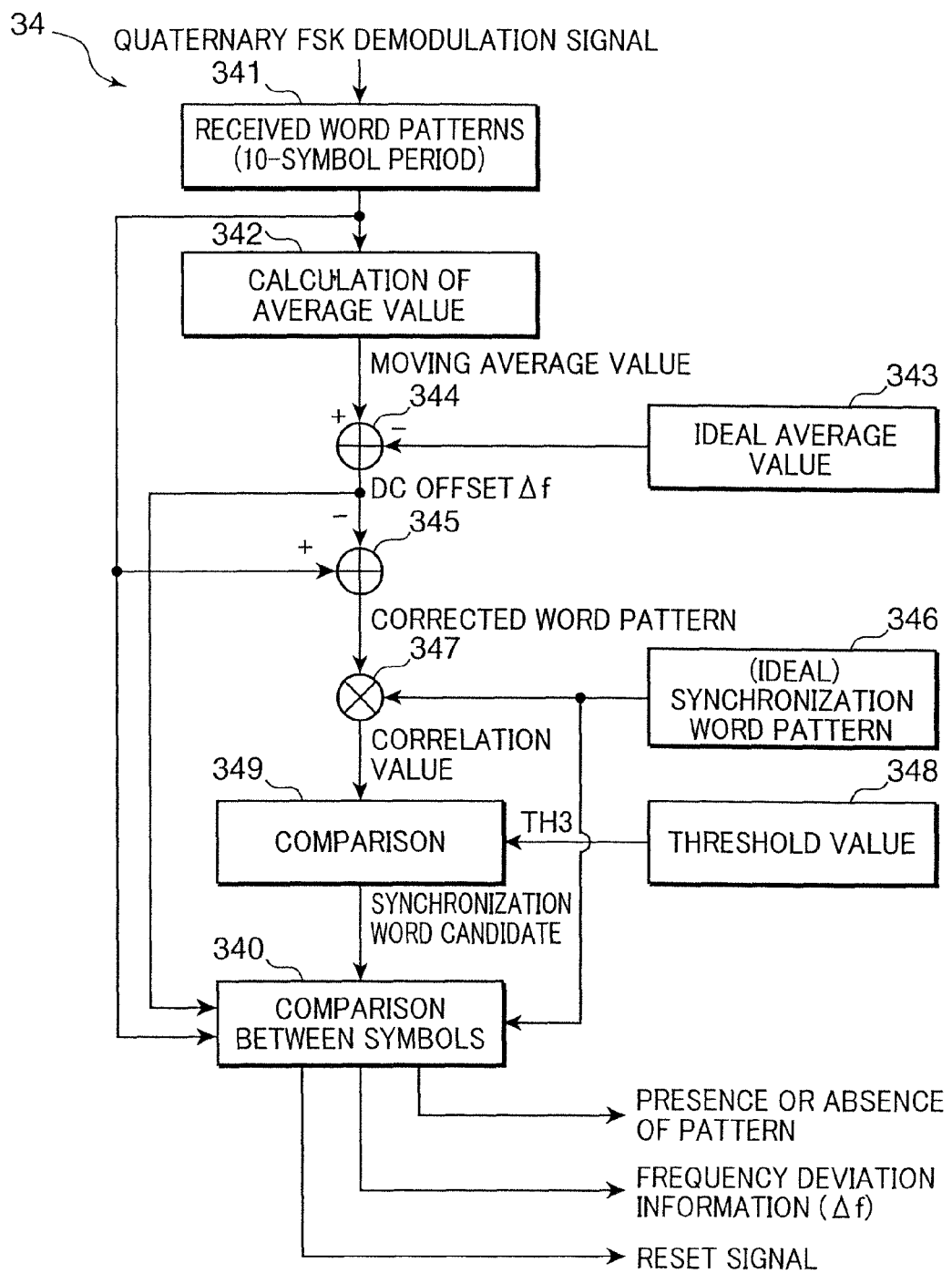
FIG. 7 is a block diagram showing one example of a configuration of a synchronization-word-pattern detection circuit.

It is also noted that, in this embodiment, the correction of the DC offset $\Delta f$ caused by a difference between transmitted and received frequencies is performed in an early stage to allow the synchronization-word-pattern detection circuit 34 serving as a frame-synchronization detection circuit to detect a synchronization word pattern. FIG. 7 is a block diagram showing one example of a configuration of the synchronization-word-pattern detection circuit 34. The synchronization-word-pattern detection circuit 34 roughly comprises: a memory 341 for storing therein over-sample values for a given number of (e.g., 10) symbol periods in a received word pattern (the demodulation signal); an average-value calculation section 342 operable to calculate a moving average value of the over-sample values; a register 343 which stores therein an average value of the given number of over-sample values in a previous synchronization word pattern, as an ideal average value; a subtracter 344 operable to derive a DC offset from a difference between the ideal average value stored in the register 343 and the moving average value calculated by the average-value calculation section 342; a subtracter 345 operable to subtract the DC offset from each of the over-sample values in the received word pattern; a memory 346 which stores therein the synchronization word pattern; a correlation processor 347 operable to perform a correlation processing of determining a correlation between the received word pattern after the DC offset correction and the synchronization word pattern stored in the memory 346; a register 348 which stores therein a predetermined threshold value TH3; a comparator 349 operable to compare a correlation value calculated by the correlation processor 347 with the threshold value TH3 stored in the register 348, wherein it is operable, when the correlation value is greater than the threshold value TH3, to recognize the synchronization word pattern as a synchronization word candidate; and a symbol comparator 340 operable, when a synchronization word candidate is recognized by the comparator 349, to compare the received word pattern after the DC offset correction with respective symbol values of the synchronization word patterns, wherein it is operable, when errors in all the symbol values fall within a given range, to determine that a synchronization word pattern is detected.

Figure 8:
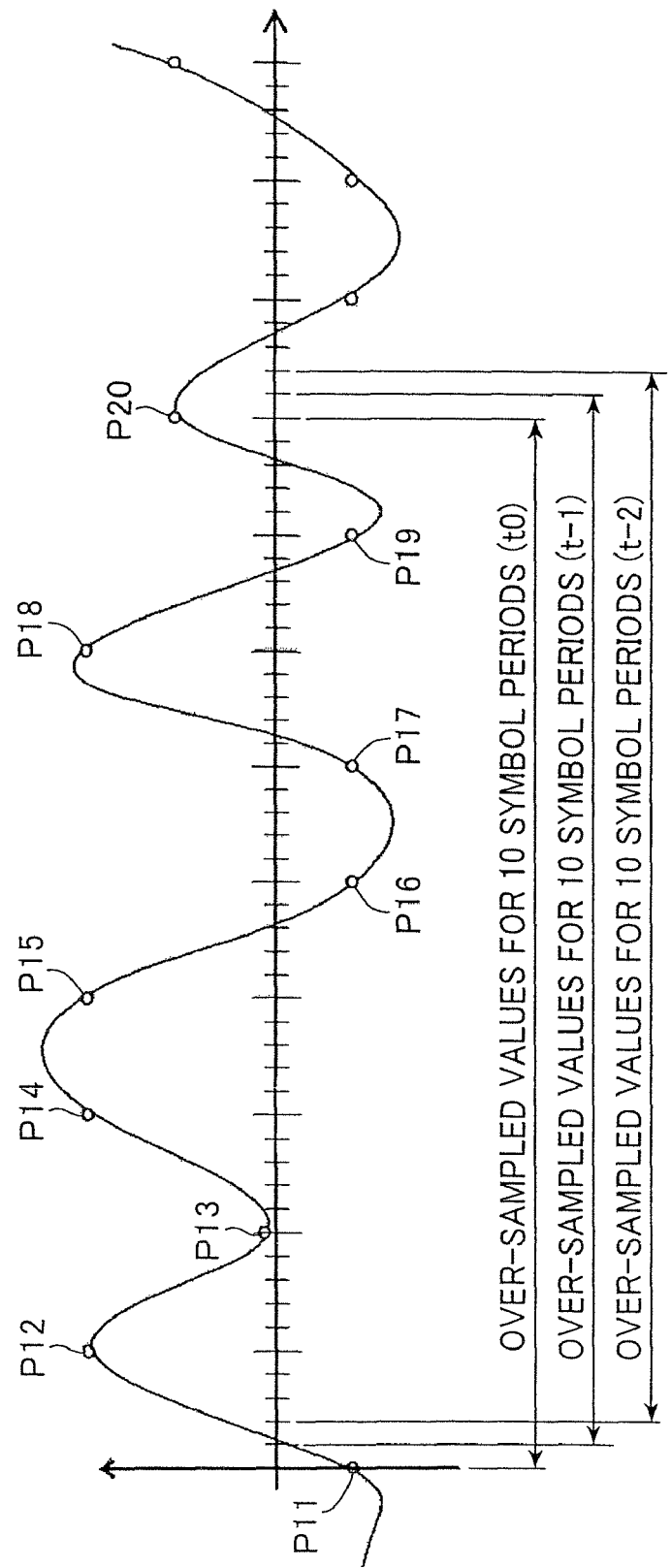
FIG. 8 is a waveform chart for explaining an operation of the synchronization-word-pattern detection circuit illustrated in FIG. 7.

FIGS. 8 to 12 are waveform charts for explaining an operation of the above synchronization-word-pattern detection circuit 34. In the above description, it has been described that the over-sampling is performed at a frequency which is ten times greater than the symbol clock. However, in order to avoid complexity in illustration, these figures show data of every other sample (this is equivalent to cases where the over-sampling is performed at a frequency which is five times greater than the symbol clock). The 24 ksps received word pattern (the demodulation signal) output from the root-raised-cosine filter 32 is input into the memory 341. Specifically, as shown in FIG. 8, the over-sample values are sequentially updated every time a new over-sample value is input, at respective times - - - , t–2, t–1, t0, as shown in FIG. 8, and stored in the memory 341 only for latest ten symbol periods. In FIG. 8, the over-sample values are indicated by the continuous solid line, and symbol values P11 to P20 are indicated by the circle marks.

Figure 9:
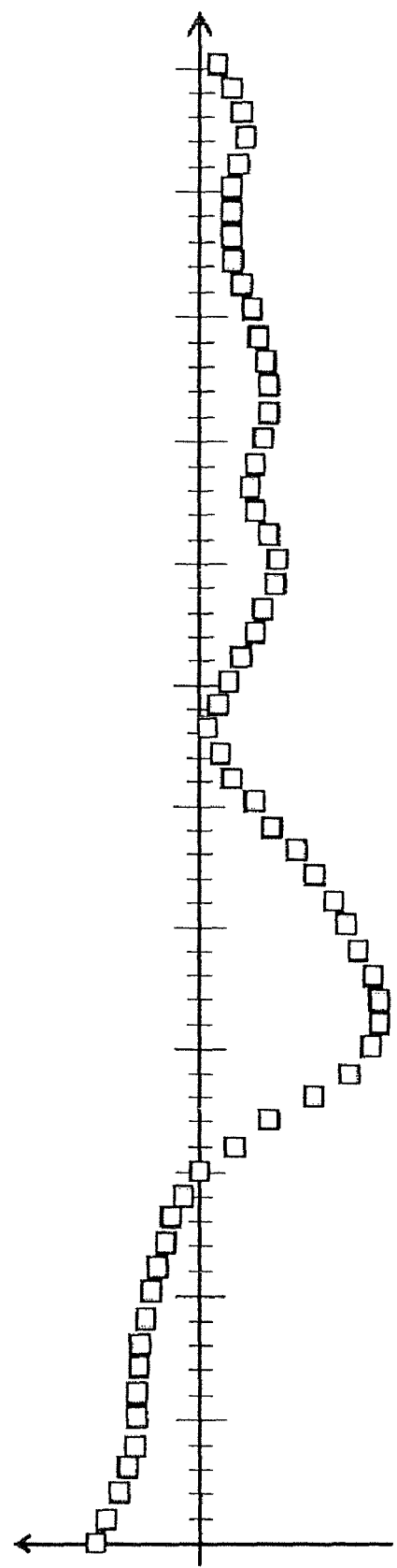
FIG. 9 is a waveform chart for explaining the operation of the synchronization-word-pattern detection circuit illustrated in FIG. 7.

Subsequently, in the average-value calculation section 342, an average value of the over-sample values is calculated every time a content stored in the memory 341 is updated. Specifically, a moving average value of the over-sample values as shown in FIG. 9 is sequentially calculated. Then, the average value for ten symbol periods in the synchronization word pattern, which is stored in the register 343, is subtracted from the moving average value output from the average-value calculation section 342 by the subtracter 344 serving as offset calculation means, to derive a DC offset (frequency correction amount) $\Delta f$. Further, in the subtracter 345, the DC offset $\Delta f$ is subtracted from each of the over-sample values in the received word pattern stored in the memory 341 to obtain a received word pattern after the DC offset correction.

Figure 10:
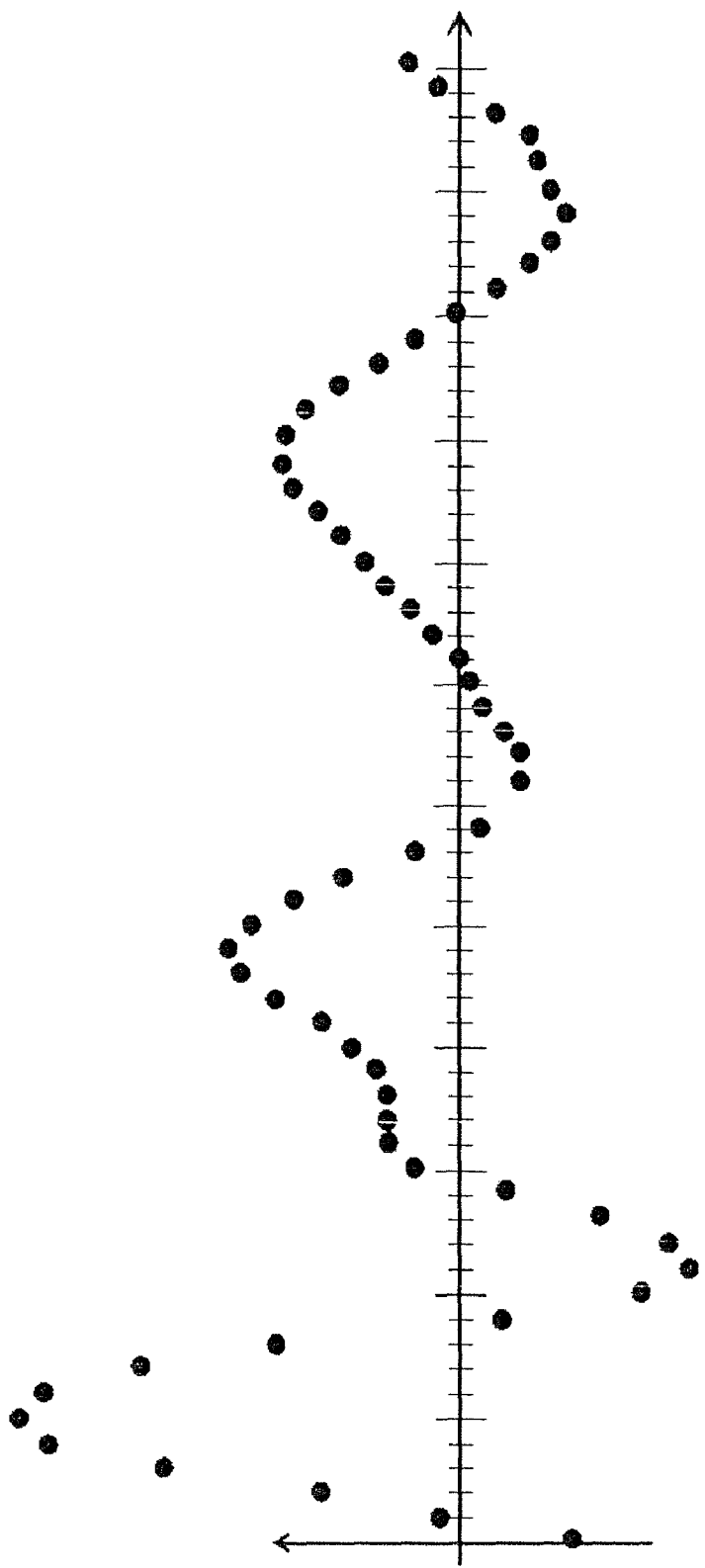
FIG. 10 is a waveform chart for explaining the operation of the synchronization-word-pattern detection circuit illustrated in FIG. 7.

Then, in the correlation processor 347, the correlation (convolution) processing is performed to determining a correlation between the received word pattern after the DC offset correction and the synchronization word pattern stored in the memory 346 to derive a correlation value illustrated in FIG. 10. Specifically, the correlation value F is expressed as follows: $F=\Sigma[ai \cdot (bi-\Delta f)]$, wherein ai is the synchronization word pattern, and bi is the received word pattern, and wherein i is the number of samplings (i=1, 2, - - - 91)). In the FSK, for example, frame data having a frame time of 80 or 40 msec is formed to have a synchronization word including a synchronization burst, and a traffic channel which is main data. The synchronization word pattern stored in the memory 346 is a pattern of the above synchronization word.

Figure 11:
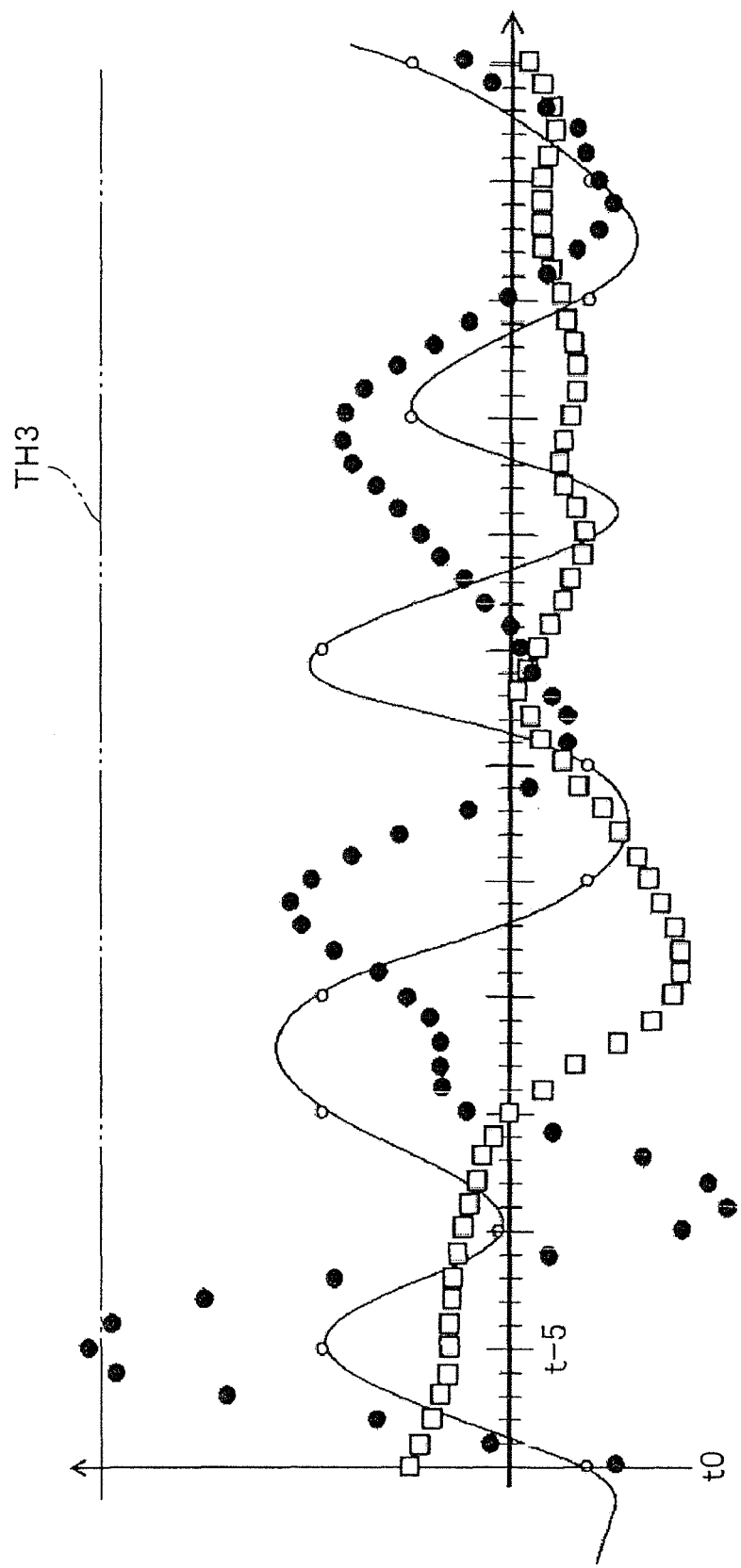
FIG. 11 is a waveform chart for explaining the operation of the synchronization-word-pattern detection circuit illustrated in FIG. 7.

In the comparator 349 serving as candidate determination means, the derived correlation value F is compared with the threshold value TH3 stored in the register 348. In the example illustrated in FIGS. 8 to 10, as shown in FIG. 11, the correlation value F becomes greater than the threshold value TH3 at a time t−5 preceding by five samplings. Thus, the comparator 349 determines that a synchronization word candidate is received, and determines the time t−5 as a tentative symbol timing. Specifically, in the correlation (convolution) processing, displacing (shifting) in a y-axis direction in the graph illustrated in FIGS. 8 to 11 is performed by the offset correction, and displacing (shifting) in an x-axis direction is performed by successive input, so that matching between the received word pattern and the fixed synchronization word pattern can be determined.

Figure 12:
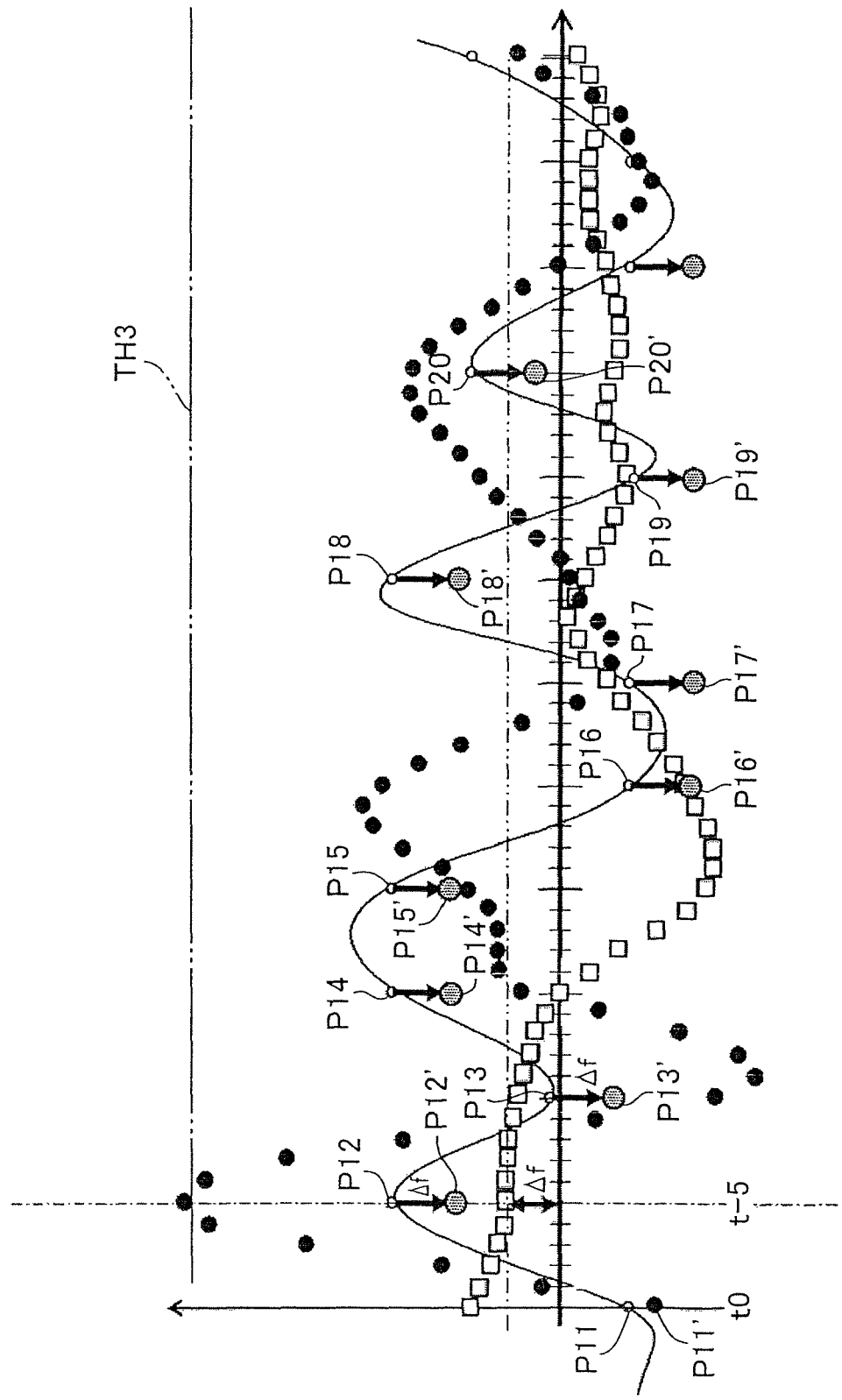
FIG. 12 is a waveform chart for explaining the operation of the synchronization-word-pattern detection circuit illustrated in FIG. 7.

Then, the symbol comparator 340 serving as final determination means is triggered by the candidate determination, to correct the DC offset $\Delta f$ with respect to symbol value P11 to P20 as shown in FIG. 12, and compare corrected symbol values P11' to P20' with corresponding symbol values in the synchronization word pattern stored in the memory 346. Then, if errors in all the symbols fall within a given range, the symbol comparator 340 determines that a synchronization word pattern is finally detected. Specifically, the error E is expressed as follows: $E=\Sigma|Ak-(Bk-\Delta f)|$, wherein Ak is each symbol value of the synchronization word pattern, and Bk is each symbol value of the received word pattern, and wherein k is the number of samplings (k=1, 2, - - -, 10). In this formula, when the error E is equal to or less than a predetermined threshold TH4, the symbol comparator 340 performs the final synchronization determination.

In the above detection-determination of a synchronization word pattern, the symbol comparator 340 is operable to provide a reset signal to the quaternary FSK symbol regeneration circuit 33 at the timing of detecting a synchronization word pattern to adjust a timing of the internal symbol clock, as described later. The symbol comparator 340 is also operable to set the tentative DC offset $\Delta f$ used for the determination in the above manner, to a true value, and provide a value corresponding to the true value, to the quaternary FSK symbol regeneration circuit 33 and the DC offset correction circuit 50, as the frequency deviation information, to allow the DC offset collection to be performed until an end of communication, as described later. Further, the symbol comparator 340 is operable, in response to the detection of a synchronization word pattern, to inform the quaternary FSK symbol regeneration circuit 33 and the frame formation circuit 35 of the fact that a synchronization word pattern is detected, i.e., signal receiving is normally performed, and permit symbol generation in the quaternary FSK symbol regeneration circuit 33, and frame formation, i.e., audio output in the frame formation circuit 35. On the other hand, if the comparator 349 determines that the correlation value is equal to or less than the threshold value TH3, and the symbol comparator 340 determines that no synchronization word pattern is detected, the above control output is not performed.

According to the above configuration, the DC offset $\Delta f$ is removed by the subtractor 344 before the correlation (convolution) processing in the correlation processor 347, so that the threshold value for making the determination on detection of a synchronization word pattern in the symbol comparator 340 can be severely set. In addition, instead of making the determination on detection of a synchronization word pattern based on a result of the correlation (convolution) processing, the final detection is performed on a condition that errors at all symbol points fall within a given range. As a result, frame synchronization can be established rapidly with a high degree of accuracy.

Figure 13:
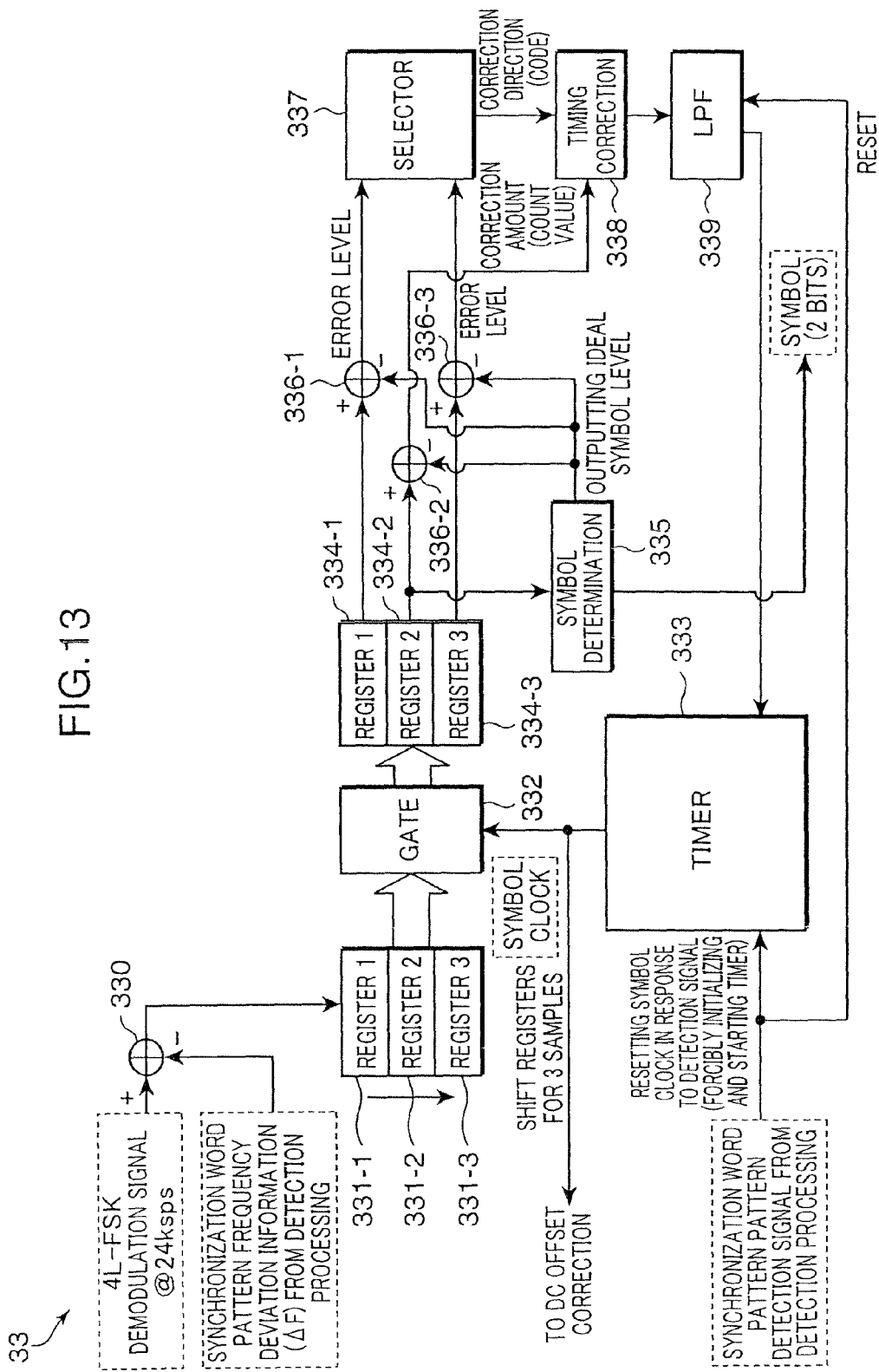
FIG. 13 is a block diagram showing one example of a configuration of a quaternary FSK symbol regeneration circuit.

Further, it is noted that, in this embodiment, the quaternary FSK symbol regeneration circuit 33 is operable to correct the symbol clock in such a manner as to obtain the sample values (frequency deviations) P1 to P9, P3' to P9' in FIG. 4(*a*). FIG. 13 is a block diagram showing one example of a configuration of the quaternary FSK symbol regeneration circuit 33. In this quaternary FSK symbol regeneration circuit 33, the demodulation signal over-sampled a sampling rate which is ten times greater than a symbol rate of an output from the root-raised-cosine filter 32 is input into a subtracter 330, and the frequency deviation information corresponding to the DC offset $\Delta f$ obtained by detecting a synchronization word pattern in the symbol comparator 340 of the synchronization-word-pattern detection circuit 34 is subtracted from the demodulation signal, whereafter the obtained signal is input into a shift register 331-1. Two-stage shift registers 331-2, 331-3 are cascade-connected to the shift register 331-1, in such a manner that, when new sample data is input, the registers will be sequentially shifted. Thus, in terms of a cycle of the oversampling, the newest data is held by the shift register 331-1, and oldest data is held by the shift register 331-3, in an amount obtained by three samplings.

The subtraction of the frequency deviation information by the subtracter 330 is performed only if a synchronization word pattern is detected by the synchronization-word-pattern detection circuit 34, i.e., a frame is received, and signal receiving is normally performed. If not, compensation is performed based on the control of the oscillation frequency of each of the local oscillator circuits 223, 243 by the DC offset correction circuit 50, or the subtraction of the DC offset component by the subtracter 62. The symbol comparator 340 is operable, in a period where a synchronization word pattern is detected, to output the DC offset $\Delta f$, and, in a period where no synchronization word pattern is detected, to set the $\Delta f$ to zero. In this way, when a synchronization word pattern is detected by the synchronization-word-pattern detection circuit 34, the correction based the DC offset $\Delta f$ detected at this timing is prioritized, so that the compensation of the DC offset $\Delta f$ can be rapidly performed.

Meanwhile, in the DC offset correction circuit 50, the subtraction of the frequency deviation information corresponding to the DC offset $\Delta f$ is also performed by the subtracter 502, so that the correction operation within the DC offset correction circuit 50 can be performed on the same condition as that for the case where, in response to the detection of a synchronization word pattern by the synchronization-word-pattern detection circuit 34, the frequency deviation information is rapidly subtracted by the subtractor 330 of the quaternary FSK symbol regeneration circuit 33 to compensate the DC offset, as described above. Specifically, the DC offset correction in response to the detection of a synchronization word pattern by the synchronization-word-pattern detection circuit 34 is performed by the quaternary FSK symbol regeneration circuit 33 on a priority basis, as mentioned above, and the subtraction of the frequency deviation information is performed by the subtracter 502 in the DC offset correction circuit 50, without redundantly performing the correction by the quaternary FSK symbol regeneration circuit 33 and the correction by the DC offset correction circuit 50. In the period where no synchronization word pattern is detected, the symbol comparator 340 sets the frequency deviation information to zero, so that the correction for the local oscillator circuits 223, 243 and others by the DC offset correction circuit 50 is fully performed.

In a communication (calling) after a synchronization word pattern is detected, frequency deviation information (DC offset) obtained from an initial synchronization word is used, and this frequency deviation information (DC offset) is continuously used until the communication (calling) is terminated. Further, once the synchronization-word-pattern detection circuit 34 detects a synchronization word pattern, a synchronization word can be subsequently detected by the usual symbol regeneration operation in the quaternary FSK symbol regeneration circuit 33, so that the synchronization-word-pattern detection circuit 34 does not perform any synchronization-word-pattern detection processing until the communication (calling) is terminated. This means that signal receiving is performed while having a frequency deviation. Thus, as compared with the correction operation by the DC offset correction circuit 50, a compatibility in the bandpass filter 224 and the low-pass filers 245, 246; 27, 28 becomes poor. However, in practice, no error will occur in regenerated symbol data, because a synchronization word pattern has already been detected, and a signal is input into the quaternary FSK symbol regeneration circuit 33 at a level causing no problem in demodulation.

Figure 14:
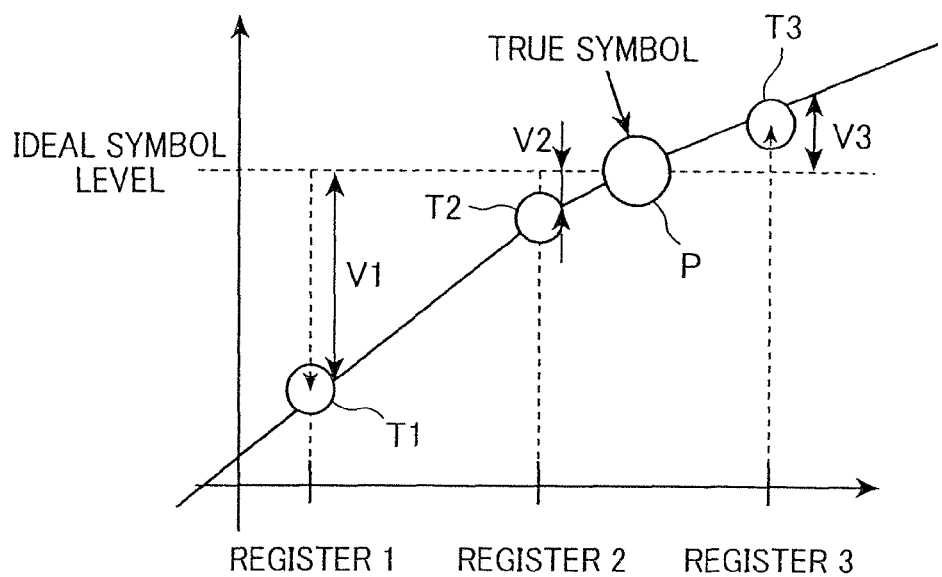
FIG. 14 is a waveform chart for explaining an operation of the quaternary FSK symbol regeneration circuit illustrated in FIG. 13.

Returning to FIG. 13, at a timing of the symbol clock generated by a timer 333, the contents stored in each of the shift registers 331-1 to 3 is loaded into three shift registers 334-1 to 3 through a gate circuit 332. Thus, sample values at a sample point T2 adjacent to an ideal symbol point P and two sample points T1, T3 on both sides of the sample point T2, as shown in FIG. 14, are stored in respective ones of the shift registers 334-2, 334-1 and 334-3. Then, the sample value at the sample point T2 is input into a symbol determination section 335, and it is determined to which of the "00", "01", "10", "11" is most likely to correspond to an actual symbol value P estimated from the sample value at the sample point T2. A result of the determination is output to the frame formation circuit 35, as the 2 bit, 2.4 ksps signal.

Further, an ideal amplitude level corresponding to the symbol value determined by the symbol determination section 335 is output from the symbol determination section 335, and subtracted from a content stored in each of the shift registers 334-1 to 3 by a corresponding one of three subtracters 336-1 to 3. Among error (difference values) levels V1 to V3 with respect to a result of the subtraction, i.e., the ideal amplitude level, the levels of the errors V1, V3 of the sample values in the shift registers 334-1, 3, i.e., at the sample points T1, T3 are input into a selector 337, and it is determined which of the errors is larger. Then, one of the sample points having a smaller one of the errors, i.e., the sample point T3 in FIG. 14, is output to a timing correction circuit 338, as data (index) on a direction along which the sample point T2 is to be moved.

The error level V2 in the subtracter 336-2 is input into the timing correction circuit 338, as data on a correction amount. The timing correction circuit 338 is operable to combine a code as data on the correction direction with a count value corresponding to the correction amount data, and output the combined data as a timing control signal to the timer 333 through a loop filter 339. The loop filter 339 is constructed to be equipped with a low-pass filter, such as an IIR filter. The symbol clock becomes more stable as a time constant becomes larger, and followability of the symbol clock becomes higher as the time constant becomes smaller.

The timer 333 is provided with a free-running counter, such as a digital VCO, having an oscillation frequency set to a symbol frequency, and designed to be reset at a time when a period thereof becomes coincident with a symbol period (symbol timing), except an overflowed count, to restart a count operation. The symbol timing is set at a timing when a phase of the digital VCO passes through zero degree. For example, in cases where the phase "0 to 360 degrees" of the VCO (one symbol period) is set to correspond to a count value "0 to 30000", the timer 333 may be configured to add 3000 at each of over-sample points T so as to regenerate a symbol clock capable of sampling a symbol value having a symbol rate of 2.4 ksps from 24 ksps over-sample data.

In the example illustrated in FIG. 14, the timer 333 may be configured such that a count value at a timing when the phase of the digital VCO becomes zero is initially set, for example, to 500, to advance a symbol clock in a next cycle, in a direction toward the sample point T3 or an advance direction, i.e., the correction direction, by 500 counts in conformity to the error V2 at the sample point T2, i.e., the correction amount. Thus, only during a period where the timer 333 counts to 500, the symbol timing is advanced, and a sample point T2 in a next cycle will come closer to the actual symbol point P. More specifically, if the count value "500" is corrected during repetition of the count operation, the timer 333 will overflow at 30500, so that it is reset at that timing, and a new correction value 500 is added to the 500 except an overflowed count to restart the counter operation. In the next cycle, the timer 333 overflows at 31000. In this manner, when a total correction amount reaches 3000, the sampling timing is advanced by one sampling.

Figure 15:
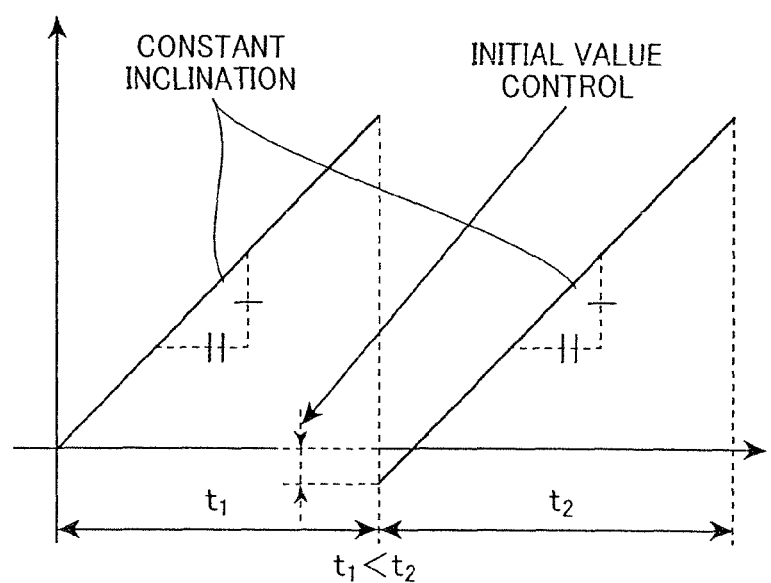
FIG. 15 is a waveform chart for explaining a count operation of a timer in the quaternary FSK symbol regeneration circuit illustrated in FIG. 13.

FIG. 15 shows one example of an operation of the timer 333, wherein an initial value is set to a negative value to retard the symbol timing. A resolution is enhanced by increasing a maximum value of the timer, and a correction accuracy is improved by increasing a sampling rate of over-sample. In cases where the error V2 at the sample point T2 is less than a given value, stability is improved by providing a dead-band where the timing correction is not performed. The timer 333 is configured to be forcibly initialized by the reset signal output from the symbol comparator 340 of the synchronization-word-pattern detection circuit 34 at a timing of detecting a synchronization word patter, to restart the count operation.

As above, in the quaternary FSK symbol regeneration circuit 33 in this embodiment, in order to sample a demodulation signal at a predetermined symbol point, and regenerate demodulation data from an amplitude value of the obtained symbol data, symbol data is obtained by over-sampling the demodulation signal at a frequency greater than a symbol clock, and difference values V1 to V3 between respective symbol data at three sample points consisting of a sample point T2 adjacent to the symbol point P and two sample points T1, T3 on both sides of the sample point T2, and an ideal amplitude level to be obtained at the symbol point P, are derived by calculation means which comprises the shift resisters 331-1 to 3, the gate circuit 332, the shift registers 334-1 to 3, the symbol determination section 335 and the subtracters 336-1 to 3. Then, one of the sample points T1, T3 which has a smaller one of the difference values V1, V3 is selected by the selector 337 serving as selection means, and the timing correction circuit 338 is shift a sampling timing of the free-running timer 333 at a symbol point in a next cycle, toward the sample point T3 selected through the selector 337, by a time corresponding to the difference value V2 at the sample point T2.

Thus, in a modulation wave with quaternary codes "00", "01", "10" and "11", even in a transition which is not across a median value, such as between "00" and "01", or "10" and "11", or a transition which is across the median value but not equal in terms of a deviation from the median value, such as between "00" and "10" or "01" and "11", a deviation in the sampling timing will be gradually corrected in a cycle of the over-sampling cycle at a maximum. Further, even if a large deviation close to 180 degrees occurs in the sampling timing, a direction for correcting the timing can be detected. This makes it possible to regenerate a stable symbol clock from a multi-level modulation wave. Further, there is no dependence on an aperture rate of an eye pattern, so that a change in roll-off rate can be easily handled. Furthermore, the calculation of the timing is performed based on approximately three sample points consisting of the sample point T2 adjacent to the symbol point P and the sample points T1, T3 on both sides of the sample point T2, so that a calculation amount can be reduced. This symbol-clock regeneration technique can be applied to various modulation schemes having an eye pattern, such as a phase modulation scheme, as well as a frequency modulation scheme.

The free-running timer 333 and the loop filter 339 are forcibly reset at a timing of detecting a synchronization word pattern by the synchronization-word-pattern detection circuit 34, so that a highly-accurate symbol clock can be regenerated from an initial part of main data (traffic channel). Further, in the subtracter 330, the DC offset correction is performed for the demodulation signal, so that symbol data to be obtained at the sample point T2 can be shifted closer to the ideal amplitude level to regenerate a more stable clock.

While this specification discloses various techniques as above, major ones of the technique will be summarized as follows.

According to one aspect, there is provided a clock regeneration circuit for sampling a demodulated signal (signal demodulated by various types of modulation schemes having an eye pattern) having an amplitude corresponding to a deviation in frequency or phase of modulated waves, at a predetermined symbol point, and regenerating a symbol clock defining a timing of the sampling, so as to regenerate demodulated data from an amplitude value of obtained symbol data. The clock regeneration circuit comprises: a timer operable to generate the symbol clock; an oversampling section operable to oversample the demodulated signal at a frequency higher than the symbol clock; a calculation section operable to calculate a difference value from an ideal amplitude level to be obtained at the symbol point, for symbol data at each of total three points consisting of the symbol point and two measurement points on respective delay and advance sides with respect to the symbol point, among a plurality of symbol data obtained by the oversampling; and a selection section operable to select one of the measurement points on the respective delay and advance sides with respect to the symbol point, wherein the selected measurement point is smaller than the other measurement point in terms of the difference value; and a timing correction section causing the timer to shift a sampling timing at the symbol point in a next cycle, toward the measurement point selected by the selection section, by a time corresponding to the difference value at the symbol point.

The clock regeneration circuit having the above configuration is a circuit adapted to regenerate a symbol clock for defining a sampling timing for the synchronization detection and to be used, for example, in a receiver, such as an FSK receiver, which is designed such that a signal received by an antenna is frequency-converted according to need, and an obtained intermediate frequency signal is digital-converted and input into a demodulation circuit, whereafter, in the demodulation circuit, I and Q components obtained by quadrature-converting the intermediate frequency signal are quadrature-detected, and a symbol value is derived from an amplitude value corresponding to a deviation in frequency or phase detected by delay detection. In this type of clock regeneration circuit, a timing of a symbol clock to be generated by a free-running timer is corrected in the following manner. The demodulated signal is oversampled at a frequency higher than the symbol clock by the oversampling section, and a difference value from an ideal amplitude level to be obtained at the symbol point is derived for symbol data at each of total three points consisting of the symbol point and two measurement points on respective delay and advance sides with respect to the symbol point, among a plurality of symbol data obtained by the oversampling. Then, one of the measurement points (sample points) on the respective delay and advance sides with respect to the symbol point is selected by the selection section, wherein the selected measurement point is smaller than the other measurement point in terms of the difference value. The timing correction section shifts a sampling timing at the symbol point in a next cycle, toward the measurement point selected by the selection section, by a time corresponding to the difference value at the symbol point.

Thus, for example, in cases where modulated waves are a 4-level type having "00", "01", "10" and "11", even in a transition which does not come across a median value, such as between "00" and "01", or "10" and "11", or a transition which comes across the median value but not equal in terms of a deviation from the median value, such as between "00" and "10" or "01" and "11", a deviation in the sampling timing will be gradually corrected by an amount corresponding to a period of the oversampling at a maximum. In addition, even if a large deviation close to 180° occurs in the sampling timing, a direction for correcting the timing can be detected. The clock regeneration circuit having the above configuration can regenerate a stable symbol clock from a multi-level modulation wave. Further, there is no dependence on an aperture rate of an eye pattern, so that a change in roll-off rate can be easily handled. Furthermore, the calculation of the timing is performed based on three points consisting of the sample point and the two points on respective delay and advance sides with respect to the sample point, so that a calculation amount can be reduced.

According to another aspect, the above clock regeneration circuit comprises a synchronization-word-pattern detector operable to detect a synchronization word pattern from the demodulated signal, and, when it is determined that the synchronization word pattern is detected, output a reset signal to the timer at a timing when the synchronization word pattern is detected, wherein the timer is adapted to be reset by the reset signal output from the synchronization-word-pattern detector.

In this clock regeneration circuit, the free-running timer is reset when the synchronization-word-pattern detector detects a synchronization word pattern, so that a highly-accurate symbol clock can be regenerated from an initial part of main data (traffic channel).

According to another aspect, in the above clock regeneration circuit, the synchronization-word-pattern detector is operable to detect a DC offset caused by a deviation between transmitted and received frequencies during communication, based on detection of the symbol clock, wherein the clock regeneration circuit further comprises a subtracter operable to correct the DC offset, from the demodulated signal input into the calculation section.

In this clock regeneration circuit, the clock regeneration is performed after the DC offset caused by a deviation between transmitted and received frequencies is corrected, so that symbol data to be obtained at the symbol point can be brought closer to the ideal amplitude level.

Thus, a more stable clock can be regenerated.

According to another aspect, there is provided a receiver which uses one of the above clock regeneration circuits.

The receiver having the above configuration can regenerate a stable symbol clock from a multi-level modulation wave in a small calculation amount.

This application is based on Japanese Patent Application Serial No. 2008-198884, filed in Japan Patent Office on Jul. 31, 2008, the contents of which are hereby incorporated by reference.

Although the present invention has been illustrated and described adequately and fully by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

The present invention can provide a clock regeneration circuit and a receiver using the same.

The invention claimed is:

1. A clock regeneration circuit for sampling a demodulated signal with an amplitude corresponding to a deviation in frequency or phase of modulated waves, at a predetermined symbol point, and regenerating a symbol clock defining a timing of the sampling, so as to regenerate demodulated data from an amplitude value of obtained symbol data, comprising:
   a timer operable to generate the symbol clock;
   an oversampling section operable to oversample the demodulated signal at a frequency higher than the symbol clock;
   a calculation section operable to calculate a difference value from an ideal amplitude level to be obtained at the symbol point, for symbol data at each of total three points consisting of the symbol point and two measurement points on respective delay and advance sides with respect to the symbol point, among a plurality of symbol data obtained by the oversampling;
   a selection section operable to select one of the measurement points on the respective delay and advance sides with respect to the symbol point, the selected measurement point being smaller than the other measurement point in terms of the difference value; and
   a timing correction section causing the timer to shift a sampling timing at the symbol point in a next cycle, toward the measurement point selected by the selection section, by a time corresponding to the difference value at the symbol point.

2. The clock regeneration circuit as defined in claim 1, which comprises a synchronization-word-pattern detector operable to detect a synchronization word pattern from the demodulated signal, and, when it is determined that the synchronization word pattern is detected, output a reset signal to the timer at a timing when the synchronization word pattern is detected, wherein the timer is adapted to be reset by the reset signal output from the synchronization-word-pattern detector.

3. The clock regeneration circuit as defined in claim 2, wherein the synchronization-word-pattern detector is operable to detect a DC offset caused by a deviation between transmitted and received frequencies during communication, based on detection of the symbol clock, and wherein the clock regeneration circuit further comprises a subtracter operable to correct the DC offset, from the demodulated signal input into the calculation section.

4. A receiver using the clock regeneration circuit as defined in claim 1.

* * * * *